(12) United States Patent
Tian

(10) Patent No.: US 12,490,206 B2
(45) Date of Patent: Dec. 2, 2025

(54) SIGNAL DETECTION METHOD, SIGNAL TRANSMISSION METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventor: Wenqiang Tian, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 580 days.

(21) Appl. No.: 17/841,880

(22) Filed: Jun. 16, 2022

(65) Prior Publication Data

US 2022/0312353 A1    Sep. 29, 2022

Related U.S. Application Data

(63) Continuation of application No. PCT/CN2019/126050, filed on Dec. 17, 2019.

(51) Int. Cl.
*H04W 56/00* (2009.01)
*H04L 5/00* (2006.01)

(52) U.S. Cl.
CPC ......... *H04W 56/001* (2013.01); *H04L 5/0051* (2013.01)

(58) Field of Classification Search
CPC ............... H04W 56/001; H04W 48/16; H04W 56/0015; H04L 5/0051; H04L 5/0048; H04L 5/0053

See application file for complete search history.

(56) References Cited

U.S. PATENT DOCUMENTS

| | | | |
|---|---|---|---|
| 2018/0262313 A1 | 9/2018 | Nam et al. | |
| 2019/0379431 A1* | 12/2019 | Park | H04L 27/2613 |
| 2021/0029572 A1* | 1/2021 | Harada | H04W 24/10 |

(Continued)

FOREIGN PATENT DOCUMENTS

| | | |
|---|---|---|
| CN | 109802757 A | 5/2019 |
| CN | 110167134 A | 8/2019 |

(Continued)

OTHER PUBLICATIONS

International Search Report and Written Opinion dated Aug. 20, 2020 in International Application No. PCT/CN2019/126050. English translation attached.

(Continued)

*Primary Examiner* — John D Blanton
(74) *Attorney, Agent, or Firm* — Sheppard, Mullin, Richter & Hampton LLP

(57) ABSTRACT

Embodiments of the present disclosure provide a signal detection method, a signal transmission method, a terminal device, and a network device, capable of accurately detecting a Channel State Information-Reference Signal (CSI-RS) resource, avoiding unnecessary detection, and reducing detection overhead of the terminal device. The method includes: detecting, by a terminal device, first Synchronization Signal/Physical Broadcast Channel Block (SSB) information, wherein the first SSB information includes an SSB candidate index associated with a CSI-RS; and detecting, by the terminal device, the CSI-RS associated with the SSB candidate index.

17 Claims, 6 Drawing Sheets

300

Transmitting, by a network device, an SSB, wherein first SSB information corresponding to the SSB includes an SSB candidate index associated with a CSI-RS — S310

Transmitting, by the network device, the CSI-RS associated with the SSB candidate index — S320

(56) References Cited

U.S. PATENT DOCUMENTS

| | | | | |
|---|---|---|---|---|
| 2021/0136646 | A1* | 5/2021 | Tseng | H04W 36/0088 |
| 2021/0235513 | A1* | 7/2021 | Kim | H04W 56/001 |
| 2021/0298087 | A1* | 9/2021 | Ohara | H04W 74/0833 |
| 2021/0385037 | A1* | 12/2021 | Yoon | H04L 5/0048 |
| 2022/0086777 | A1* | 3/2022 | He | H04W 56/006 |
| 2022/0159589 | A1* | 5/2022 | Yu | H04L 1/1874 |
| 2022/0167309 | A1* | 5/2022 | Kim | H04W 52/242 |
| 2024/0121623 | A1* | 4/2024 | Matsumura | H04W 72/1273 |
| 2024/0137937 | A1* | 4/2024 | Matsumura | H04W 24/08 |

FOREIGN PATENT DOCUMENTS

| | | |
|---|---|---|
| CN | 110351740 A | 10/2019 |
| CN | 110971382 A | 4/2020 |
| EP | 3471318 A1 | 4/2019 |

OTHER PUBLICATIONS

Extended European Search Report dated Nov. 8, 2022 received in European Patent Application No. EP19956934.4.
Samsung: "Issues/Corrections: CSI-RS based MeasObjectNR configuration", 3GPP Draft; R2-1801411 Issues and Corrections for CS I-RS Based Measobjectnr Conf Iguration , 3rd Generation Partnership Project (3GPP) , Mobile Competence Centre;650 , Route Des Lucioles ; F-06921 Sophi vol. RAN WG2 , no. Vancouver, Canada; Jan. 22, 2018-Jan. 26, 2018 Jan. 12, 2018 (Jan. 12, 2018) , XP051386820.
Huaweiet Al: "Remaing issues on RA resource selection for multi-beam operations" , 3GPP Draft; R2-1807973 Remaining Issues on RA Resource Selection for Mult I-Beam Operations , 3rd Generation Partnership Project (3GPP) , Mobile Competence Centre 650 , Route Des Lucioles ; F-06921 Soph vol. RAN WG2 , no. Busan, Korea; May 21, 2018-May 25, 2018 May 20, 2018 (May 20, 2018) , XP051444298.

* cited by examiner

SIGNAL DETECTION METHOD, SIGNAL TRANSMISSION METHOD, TERMINAL DEVICE, AND NETWORK DEVICE

CROSS-REFERENCE TO RELATED APPLICATIONS

The present application is a continuation of International Application No. PCT/CN2019/126050 filed on Dec. 17, 2019, which is hereby incorporated by reference in its entirety.

FIELD

The present disclosure relates to the field of communications, and more particularly, to a signal detection method, a signal transmission method, a terminal device, and a network device.

BACKGROUND

Periodic transmission of synchronization signals is very important for communication systems. For example, in a New Radio-based access to unlicensed spectrum (NR-U) system, due to a Listen Before Talk (LBT) mechanism, a base station may not be able to preempt a channel at any time, and thus it is necessary to ensure the transmission of synchronization signals as much as possible when an available channel is uncertain. In addition, in the NR-U system, in order to meet requirements for a channel occupancy rate and the like, the base station, when transmitting a Synchronization Signal/Physical Broadcast Channel Block (SSB), needs to transmit a Channel State Information-Reference Signal (CSI-RS) resource correspondingly. The SSB may include a Synchronization Signal (SS) and a Physical Broadcast Channel (PBCH). However, there is no definite solution for the terminal device to accurately detect the CSI-RS resource.

SUMMARY

Embodiments of the present disclosure provide a signal detection method, a signal transmission method, a terminal device, a network device, and a communication system, capable of accurately detecting a CSI-RS, avoiding unnecessary detection, and reducing detection overhead of the terminal device.

An embodiment of the present disclosure provides a signal detection method. The method includes: detecting, by a terminal device, first Synchronization Signal/Physical Broadcast Channel Block (SSB) information, wherein the first SSB information includes an SSB candidate index associated with a CSI-RS; and detecting, by the terminal device, the CSI-RS associated with the SSB candidate index.

In some possible implementations, the method further includes: receiving, by the terminal device, configuration information, wherein the configuration information includes the first SSB information.

In some possible implementations, the configuration information further includes second SSB information, and the second SSB information includes an SSB index associated with the CSI-RS.

In some possible implementations, the method further includes: determining, by the terminal device, that the first SSB information or the second SSB information in the configuration information is valid.

In some possible implementations, said detecting, by the terminal device, the first SSB information includes: determining, by the terminal device in response to determining that the first SSB information in the configuration information is valid, that first SSB information corresponding to a detected SSB is consistent with the first SSB information in the configuration information.

In some possible implementations, the method further includes: determining, by the terminal device in response to determining that the second SSB information in the configuration information is valid, that second SSB information corresponding to a detected SSB is consistent with the second SSB information in the configuration information.

In some possible implementation manners, said determining, by the terminal device, that the first SSB information or the second SSB information in the configuration information is valid includes at least one of: determining, by the terminal device, that the first SSB information is valid, when the received configuration information includes the first SSB information and the second SSB information; determining, by the terminal device, that the second SSB information is valid, when the received configuration information includes the first SSB information and the second SSB information; determining, by the terminal device, that the first SSB information is valid, when the received configuration information includes a validity identifier of the first SSB information and the first SSB information; or determining, by the terminal device, that the second SSB information is valid, when the received configuration information includes a validity identifier of the second SSB information and the second SSB information.

An embodiment of the present disclosure provides a signal transmission method. The method includes: transmitting, by a network device, an SSB, wherein first SSB information corresponding to the SSB includes an SSB candidate index associated with a CSI-RS; and transmitting, by the network device, the CSI-RS associated with the SSB candidate index.

In some possible implementations, the method further includes: transmitting, by the network device, configuration information, wherein the configuration information includes the first SSB information.

In some possible implementations, the configuration information further includes second SSB information, and the second SSB information includes an SSB index associated with the CSI-RS.

In some possible implementation manners, the configuration information further includes a validity identifier of the first SSB information or a validity identifier of the second SSB information.

In some possible implementations, the method further includes: selecting, by the network device, to include the first SSB information or second SSB information in configuration information, wherein the first SSB information includes the SSB candidate index associated with the CSI-RS, and the second SSB information includes an SSB index associated with the CSI-RS.

An embodiment of the present disclosure provides a terminal device. The terminal device includes: a first detecting unit configured to detect first SSB information, wherein the first SSB information includes an SSB candidate index associated with a CSI-RS; and a second detecting unit configured to detect the CSI-RS associated with the SSB candidate index.

In some possible implementations, the terminal device further includes: a receiving unit configured to receive configuration information, wherein the configuration information includes the first SSB information.

In some possible implementations, the configuration information further includes second SSB information, and the second SSB information includes an SSB index associated with the CSI-RS.

In some possible implementations, the terminal device further includes: a determining unit configured to determine that the first SSB information or the second SSB information in the configuration information is valid.

In some possible implementations, the first detecting unit is further configured to determine, in response to determining by the determining unit that the first SSB information in the configuration information is valid, that first SSB information corresponding to a detected SSB is consistent with the first SSB information in the configuration information.

In some possible implementations, the terminal device further includes: a third detecting unit configured to determine, in response to determining by the determining unit that the second SSB information is valid, that second SSB information corresponding to a detected SSB is consistent with the second SSB information in the configuration information.

In some possible implementation manners, the determining unit is configured to determine that the first SSB information or the second SSB information in the configuration information is valid by at least one of: determining, when the received configuration information includes the first SSB information and the second SSB information, that the first SSB information is valid; determining, when the received configuration information includes the first SSB information and the second SSB information, that the second SSB information is valid; determining, when the received configuration information includes a validity identifier of the first SSB information and the first SSB information, that the first SSB information is valid; or determining, when the received configuration information includes a validity identifier of the second SSB information and the second SSB information, that the second SSB information is valid.

An embodiment of the present disclosure provides a network device. The network device includes: a first transmitting unit configured to transmit an SSB, wherein first SSB information corresponding to the SSB includes an SSB candidate index associated with a CSI-RS; and a second transmitting unit configured to transmit the CSI-RS associated with the SSB candidate index.

In some possible implementations, the network device further includes: a third transmitting unit configured to transmit configuration information, wherein the configuration information includes the first SSB information.

In some possible implementations, the configuration information further includes second SSB information, and the second SSB information includes an SSB index associated with the CSI-RS.

In some possible implementation manners, the configuration information further includes a validity identifier of the first SSB information or a validity identifier of the second SSB information.

In some possible implementations, the network device further includes: a selecting unit configured to select to include the first SSB information or second SSB information in configuration information, wherein the first SSB information includes the SSB candidate index associated with the CSI-RS, and the second SSB information includes an SSB index associated with the CSI-RS.

An embodiment of the present disclosure provides a communication system. The communication system includes: a terminal device configured to execute a corresponding function implemented by the terminal device in the signal detection method according to the embodiments of the present disclosure; and a network device configured to execute a corresponding function implemented by the network device in the signal transmission method according to the embodiments of the present disclosure.

An embodiment of the present disclosure provides a terminal device. The terminal device includes a memory and a processor. The memory has a computer program stored thereon. The processor is configured to invoke and execute the computer program stored in the memory to perform the method performed by the terminal device in the above signal detection method.

An embodiment of the present disclosure provides a network device. The network device includes a memory and a processor. The memory has a computer program stored thereon. The processor is configured to invoke and execute the computer program stored in the memory to perform the method performed by the network device in the above signal transmission method.

An embodiment of the present disclosure provides a chip for implementing the above signal detection method.

Specifically, the chip includes a processor configured to invoke and run a computer program from a memory, thereby causing an apparatus provided with the chip to perform the above signal detection method.

An embodiment of the present disclosure provides a chip for implementing the above signal transmission method.

Specifically, the chip includes a processor configured to invoke and run a computer program from a memory, thereby causing an apparatus provided with the chip to perform the above signal transmission method.

An embodiment of the present disclosure provides a computer-readable storage medium, having a computer program stored thereon, wherein the computer program causes a computer to perform the above signal detection method.

An embodiment of the present disclosure provides a computer-readable storage medium, having a computer program stored thereon, wherein the computer program causes a computer to perform the above signal transmission method.

An embodiment of the present disclosure provides a computer program product, including computer program instructions that cause a computer to perform the above signal detection method.

An embodiment of the present disclosure provides a computer program product, including computer program instructions that cause a computer to perform the above signal transmission method.

An embodiment of the present disclosure provides a computer program. The computer program, when running on a computer, causes the computer to perform the above signal detection method.

An embodiment of the present disclosure provides a computer program. The computer program, when running on a computer, causes the computer to perform the above signal transmission method.

In the embodiments of the present disclosure, the terminal device detects that the first SSB information includes the SSB candidate index associated with the CSI-RS, and then detects the CSI-RS associated with the SSB candidate index, thus being capable of accurately detecting the CSI-RS resource, avoiding unnecessary detection, and reducing detection overhead of the terminal device. In addition, unnecessary CSI-RS resource transmission can also be avoided, which is beneficial to reducing the system resource overhead burden.

DESCRIPTION OF EMBODIMENTS

Figure 1:
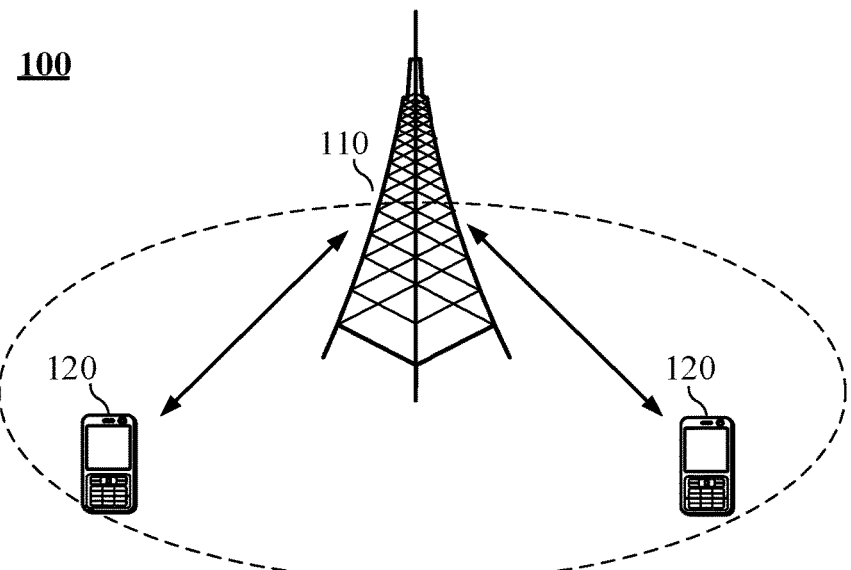
FIG. 1 is a schematic diagram of an application scenario according to an embodiment of the present disclosure.

Technical solutions according to embodiments of the present disclosure will be described below in combination with accompanying drawings of the embodiments of the present disclosure.

The technical solutions according to the embodiments of the present disclosure can be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an Advanced Long Term Evolution (LTE-A) system, a New Radio (NR) system, an evolution system of the NR system, an LTE-based access to unlicensed spectrum (LTE-U) system, an NR-based access to unlicensed spectrum (NR-U) system, a Universal Mobile Telecommunication System (UMTS), a Wireless Local Area Network (WLAN), Wireless Fidelity (WiFi), a next-generation (5th-Generation, 5G) communication system, or other communication systems.

Generally speaking, conventional communication systems support a limited number of connections and are easy to implement. However, with the development of communication technologies, mobile communication systems will not only support conventional communication, but also will support, for example, Device to Device (D2D) communication, Machine to Machine (M2M) communication, Machine Type Communication (MTC), and Vehicle to Vehicle (V2V) communication, etc. The embodiments of the present disclosure can also be applied to these communication systems.

Optionally, the communication system in the embodiments of the present disclosure may be applied to a Carrier Aggregation (CA) scenario, a Dual Connectivity (DC) scenario, or a Standalone (SA) network deployment scenario.

The embodiments of the present disclosure do not limit a spectrum to which they are applied. For example, the embodiments of the present disclosure may be applied to a licensed spectrum, or may also be applied to an unlicensed spectrum.

The embodiments of the present disclosure are described in conjunction with a network device and a terminal device. Here, the terminal device may also be referred to as User Equipment (UE), an access terminal, a user unit, a user station, a mobile station, a mobile platform, a remote station, a remote terminal, a mobile device, a user terminal, a terminal, a wireless communication device, a user agent, a user apparatus, etc. The terminal device may be a STATION (ST) in a WLAN, a cellular phone, a cordless phone, a Session Initiation Protocol (SIP) phone, a Wireless Local Loop (WLL) station, a Personal Digital Assistant (PDA) device, a handheld device having a wireless communication function, a computing device or other processing devices connected to a wireless modem, a vehicle-mounted device, a wearable device, and a next-generation communication system, e.g., a terminal device in an NR network or a terminal device in a future-evolved Public Land Mobile Network (PLMN) network.

By way of example but not limitation, in the embodiments of the present disclosure, the terminal device may also be a wearable device. The wearable device can also be called a wearable smart device, which is a general term for devices that are wearable and developed by applying wearable technology to intelligently design daily wears, such as glasses, gloves, watches, clothing, shoes, etc. A wearable device is a portable device that is worn directly on the body or integrated into a user's clothing or accessory. The wearable device is not only a hardware device, but also realizes powerful functions through software support, data interaction, and cloud interaction. In a broad sense, wearable smart devices include a fully-functioned, large-size device that can achieve all or partial functions without relying on a smart phone, e.g., a smart watch or a pair of smart glasses, and a device that only focuses on a certain type of application function and needs to cooperate with other devices such as a smartphone, e.g., various types of smart bracelets and smart jewelry that monitor physical signs.

The network device may be a device configured to communicate with a mobile device, such as an Access Point (AP) in a WLAN, a Base Transceiver Station (BTS) in a GSM or a CDMA, a base station such as NodeB (NB) in a WCDMA, a base station such as Evolutional Node B (eNB or eNodeB) in an LTE, a relay station or an access point, a vehicle-mounted device, a wearable device, a network device (gNB) in an NR network, a network device in a future evolved PLMN network, etc.

In the embodiments of the present disclosure, the network device provides services for a cell, a terminal device communicates with the network device through transmission resources (for example, frequency domain resources, or spectrum resources) used by the cell. The cell may be a cell corresponding to the network device (e.g., a base station), and the cell can belong to a macro base station, or belong to a base station corresponding to a small cell. Here, the small cell may include a metro cell, a micro cell, a pico cell, a femto cell, etc. These small cells have characteristics of small coverage and low transmit power, and are suitable for providing high-speed data transmission services.

FIG. 1 exemplarily illustrates one network device 110 and two terminal devices 120. Optionally, the wireless communication system 100 may include a plurality of network devices 110, and each network device 110 has a coverage which may include another number of terminal devices. The embodiments of the present disclosure are not limited in this regard.

Optionally, the wireless communication system 100 may further include other network entities such as a Mobility Management Entity (MME) and an Access and Mobility Management Function (AMF). The embodiments of the present disclosure are not limited to any of these examples.

It should be understood that terms "system" and "network" in the present disclosure are often used interchangeably herein. The term "and/or" in the present disclosure is only an association relationship describing associated objects, and means that there can be three kinds of relationships. For example, A and/or B can mean three situations: A exists alone, A and B exist at the same time, and B exists alone. In addition, the character "/" in the present disclosure generally represents that associated objects before and after the character "/" are in an "or" relationship.

Figure 2:
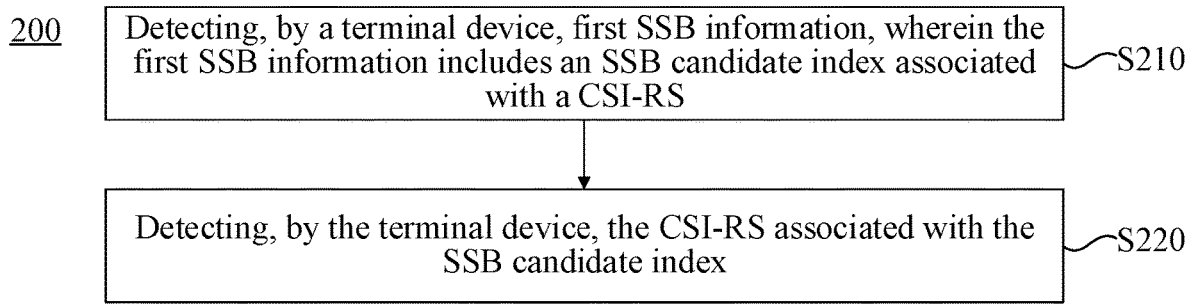
FIG. 2 is a schematic flowchart illustrating a signal detection method according to an embodiment of the present disclosure.

FIG. 2 is a schematic flowchart illustrating a signal detection method 200 according to an embodiment of the present disclosure. The method can optionally be applied to the system illustrated in FIG. 1, but is not limited thereto. The method includes at least some of the following description.

At S210, a terminal device detects first SSB information. The first SSB information includes an SSB candidate index associated with a CSI-RS.

At S220, the terminal device detects the CSI-RS associated with the SSB candidate index.

In the embodiments of the present disclosure, after receiving an SSB transmitted by the network device, the terminal device can obtain first SSB information corresponding to the SSB. The first SSB information includes an SSB candidate index corresponding to a resource position where the network device transmits the SSB. When the SSB candidate index corresponding to the resource position for transmitting the SSB is the SSB candidate index associated with the CSI-RS, the terminal device can detect the CSI-RS associated with the SSB candidate index.

Correspondingly, when the terminal device fails to detect the SSB corresponding to the SSB candidate index associated with the CSI-RS, the terminal device does not detect the CSI-RS. Or, when the terminal device does not detect an SSB candidate index corresponding to a resource position for transmitting a certain SSB, the terminal device does not detect the CSI-RS.

Optionally, in an embodiment of the present disclosure, the signal detection method further includes: receiving, by the terminal device, configuration information. The configuration information includes the first SSB information.

Optionally, in an embodiment of the present disclosure, the network device may transmit configuration information to the terminal device through Radio Resource Control (RRC) signaling. In addition, the configuration information can also be transmitted by broadcasting System information block (SIB), Medium Access Control Element (MAC CE), Downlink Control Information (DCI), and other means. The present disclosure is not limited to any of these examples.

In one example, the terminal device may receive configuration information from the network device. First SSB information in the configuration information may include a configured SSB candidate index associated with the CSI-RS. After receiving the SSB transmitted by the network device, the terminal device may obtain the SSB candidate index included in the first SSB information corresponding to the SSB. Then, the SSB candidate index corresponding to the SSB is compared with the SSB candidate index included in the first SSB information in the configuration information to determine whether they are consistent with each other. When they are consistent with each other, the terminal device can detect the CSI-RS associated with the SSB candidate index.

Optionally, in an embodiment of the present disclosure, the configuration information further includes second SSB information, and the second SSB information includes an SSB index associated with the CSI-RS.

Optionally, in an embodiment of the present disclosure, an SSB candidate index represents an index of a candidate position for transmitting an SSB, and an SSB index represents a Quasi-Co-Location (QCL) relationship between SSBs. A conversion relationship between SSB candidate indexes and SSB indexes can be obtained through a parameter Q of the QCL relationship. For example, the SSB index is obtained by performing a remainder operation through dividing the SSB candidate index by the parameter Q. For another example, the SSB index is obtained by performing the remainder operation through dividing the lower three bits of the SSB candidate index by the parameter Q.

A difference between the SSB candidate index and the SSB index will be described below through an exemplary scenario.

In some communication systems, the network device needs to transmit synchronization signals such as SSBs to the terminal device. For example, in the NR-U system, due to the existence of the LBT mechanism, the network device may not be able to preempt a channel at any time. In order to ensure the transmission of the synchronization signals as much as possible when available channels are uncertain, a plurality of SSB candidate positions may be set to provide more SSB transmission opportunities. Actual transmission positions of the SSBs may be a subset of all SSB candidate positions. For example, within a specific transmission window, 20 SSB candidate positions are configured to provide more SSB transmission opportunities. The actual transmission positions of the SSBs may be a subset of the 20 SSB candidate positions. For example, when 4 SSBs need to be transmitted, the 4 SSBs can be transmitted at the 4-th/5-th/6-th/7-th SSB candidate positions, respectively.

Figure 3:
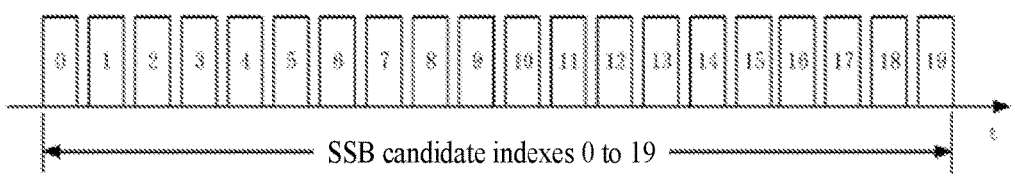
FIG. 3 is an exemplary diagram of SSB candidate indexes according to an embodiment of the present disclosure.

Each SSB candidate position has a corresponding index, i.e., an SSB candidate index, which may also be referred to as an SSB candidate position index. An SSB candidate index corresponding to an SSB detected by the UE represents an index of an SSB candidate position where the SSB is actually transmitted. As illustrated in FIG. 3, a determined SSB candidate index corresponds to a specific SSB transmission resource position in a specific transmission window, and SSB candidate indexes 0 to 19 indicate 20 SSB candidate positions.

In addition, a merge requirement may arise between a plurality of SSBs. For example, SSBs need to be merged for measurement, filtering and other purposes. In a process of merging the SSBs, it is necessary to determine the QCL relationship between the SSBs. Merging and filtering operations between SSBs having the QCL relationship make more sense. SSBs having the same SSB index can be considered as having the QCL relationship. Therefore, the QCL relationship between SSBs can be represented by the SSB index. Within a specific transmission window, a plurality of SSB candidate positions may correspond to the same SSB index. That is, an SSB having a specific SSB index, when needing to be transmitted, can be transmitted at one of the plurality of SSB candidate positions.

The relationship between the SSB candidate indexes and the SSB indexes can be represented by the parameter Q of the QCL relationship. For example, "SSB index =SSB candidate index mod Q". For another example, "SSB index =the lower three bits of the SSB candidate index mod Q", where mod represents the remainder operator.

When transmitting an SSB, the network device may select a specific transmitting position for the SSB from a plurality of SSB candidate positions. For example, when the base station wants to transmit an SSB having an SSB index of x, the base station may transmit the SSB at one of a plurality of SSB candidate positions having SSB candidate indexes of x, x+Q, x+2*Q, etc.

Figure 4:
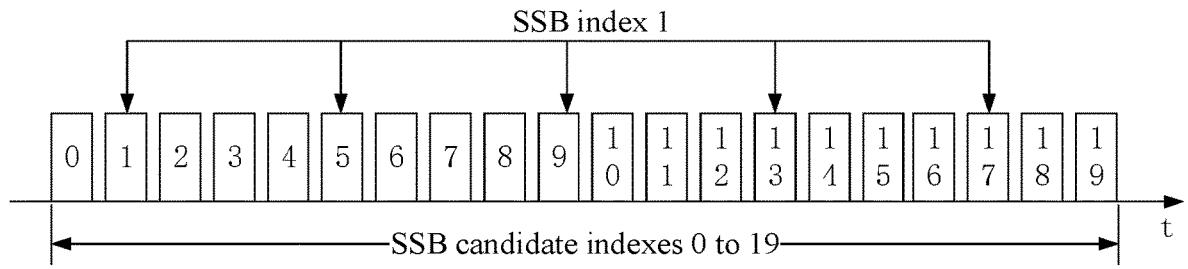
FIG. 4 is an exemplary diagram of a relationship between SSB candidate indexes and SSB indexes according to an embodiment of the present disclosure.

For example, as illustrated in FIG. 4, SSB candidate indexes 0 to 19 represent 20 SSB candidate positions. The base station needs to transmit an SSB having an SSB index of 1 (SSB index =1), and Q=4. Using "SSB candidate index mod Q=SSB index", it can be obtained that resource positions having SSB candidate indexes of 1, 5, 9, 13, and 17 correspond to SSB index of 1. The base station may transmit the SSB at one of the SSB candidate positions having the SSB candidate indexes of 1, 5, 9, 13, and 17. When the base station does not succeed in LBT at the resource position having the SSB candidate index of 1 but succeeds in LBT at the resource position having the SSB candidate index of 5, the base station can transmit the SSB having the SSB index of 1 at the resource position having the SSB candidate index of 5.

Figure 5A:
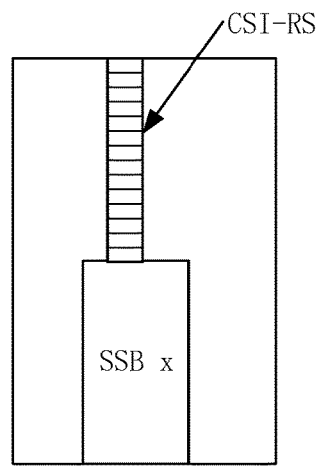
FIG. 5a and FIG. 5b are each an exemplary diagram of an association relationship between a resource position for transmitting an SSB and a CSI-RS according to an embodiment of the present disclosure.
Figure 5B:
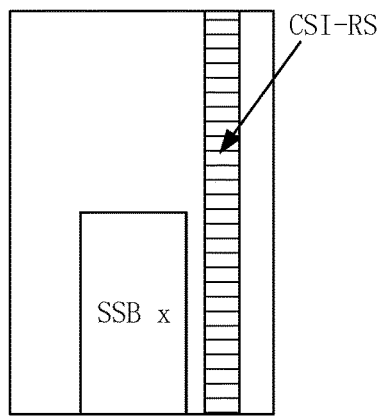

In order to meet requirements for the channel occupancy rate and the like, the network device, when transmitting the SSB, may transmit the CSI-RS on a preconfigured or configurable resource correspondingly, as illustrated in FIG. 5a and FIG. 5b. Here, in FIG. 5a and FIG. 5b, a horizontal direction represents time, and a vertical direction represents frequency. FIG. 5a illustrates that an SSB x (a resource position having the SSB candidate index of x) is associated with the CSI-RS in a frequency domain, and FIG. 5b illustrates that the SSB x is associated with the CSI-RS in a time domain. A plurality of SSB candidate positions may be available when the network device transmits an SSB. For example, when the base station needs to transmit an SSB having the SSB index of 1, the base station may transmit the SSB at one of a plurality of SSB candidate positions having SSB candidate indexes of 1, 1+Q, 1+2*Q, and the like.

In the embodiments of the present disclosure, for brevity, the resource position having the SSB candidate index of x may be referred to as an SSB candidate position x for short. Correspondingly, SSB candidate positions 1, 1+Q, 1+2*Q represent resource positions having SSB candidate indexes of 1, 1+Q, 1+2*Q.

Several exemplary cases of CSI-RS configuration will be introduced below case by case.

(1) A Case Where the CSI-RS is Not Explicitly Configured with an Associated SSB Index.

When the SSB is transmitted at the SSB candidate position 1, the SSB does not need to be transmitted at SSB candidate positions 1+Q and 1+2*Q. In this case, configuration and transmission of the CSI-RS on resources associated with the SSB candidate positions 1+Q and 1+2*Q are unnecessary and result in a waste of CSI-RS resources. In addition, when no CSI-RS is configured on the resources associated with the SSB candidate positions 1+Q and 1+2*Q and the SSB is, instead of being transmitted at the SSB candidate position 1, transmitted on the SSB candidate position 1+Q, a case may occur where an SSB corresponding to the SSB candidate index 1+Q is transmitted but the CSI-RS associated with the SSB is not transmitted. Problems also arise in this case as the channel occupancy rate such as an Occupied Channel Bandwidth (OCB) may be adversely affected. It can be seen from this example that the CSI-RS configuration of 5G NR is not applicable when the CSI-RS is transmitted in association with the SSB of the NR-U.

(2) A Case Where the CSI-RS is Configured with an Associated SSB Index

When a CSI-RS is associated with a certain SSB index, the UE needs to detect an SSB having the SSB index before detecting the CSI-RS. In this way, a burden of CSI-RS detection can be alleviated. For example, when the UE fails to detect the certain SSB index, one or more CSI-RSs associated with this SSB index do not need to be detected. In addition, after a CSI-RS is configured with an associated SSB index, the UE needs to use the SSB to determine timing information, and determine a resource position of the CSI-RS based on the determined timing information to avoid detection deviations.

Before detecting the CSI-RS, the UE needs to detect an SSB having the SSB index associated with the CSI-RS. Except for this condition, case (2) is similar to the above case (1). For example, when the CSI-RS is configured to be associated with an SSB having an SSB index of 1, the CSI-RS may be configured at a certain resource position among SSB candidate positions 1, 1+Q, 1+2*Q, etc. However, subsequently, the SSB may not necessarily be transmitted in the resource position where the CSI-RS is configured. When the CSI-RS is configured at each resource position of the SSB candidate positions 1, 1+Q, 1+2*Q, etc., it is also unnecessary to transmit the CSI-RS at other positions than the resource position where the SSB is actually transmitted.

Compared with the above two cases, in the embodiments of the present disclosure, the network device may configure, for the CSI-RS, the SSB candidate index associated with the CSI-RS, and notify, by means of configuration information, etc., the terminal device of the SSB candidate index associated with the CSI-RS. Therefore, the SSB and the CSI-RS can be bound and transmitted to meet the requirements for the channel occupancy rate. Also, unnecessary transmission and detection of the CSI-RS can be avoided, which is beneficial to alleviating the system resource overhead burden and reducing the detection overhead of terminal device.

Optionally, in an embodiment of the present disclosure, the signal detection method further includes: determining, by the terminal device, that the first SSB information or the second SSB information in the configuration information is valid.

Optionally, in an embodiment of the present disclosure, the terminal device may be notified of valid SSB information through configuration information, or a method of selecting valid SSB information may be preconfigured in the terminal device through a preconfiguration manner such as a protocol.

Optionally, in an embodiment of the present disclosure, determining, by the terminal device, that the first SSB information or the second SSB information in the configuration information is valid includes at least one of the following methods.

In method 1, the terminal device determines that the first SSB information is valid when the received configuration information includes the first SSB information and the second SSB information.

For example, after the first SSB information is preconfigured to be valid on the terminal device through a protocol, when the configuration information received by the terminal device includes the first SSB information and the second SSB information, it can be determined that the first SSB information is valid.

For another example, the configuration information transmitted by the network device to the terminal device includes a validity identifier of the first SSB information and the first SSB information, and further includes an invalidity identifier of the second SSB information and the second SSB information. After receiving the configuration information, the terminal device may determine that the first SSB information in the configuration information is valid.

In method 2, the terminal device determines that the second SSB information is valid when the received configuration information includes the first SSB information and the second SSB information.

For example, after the second SSB information is preconfigured to be valid on the terminal device through a protocol, when the configuration information received by the terminal device includes the first SSB information and the second SSB information, it can be determined that the second SSB information is valid.

For another example, the configuration information transmitted by the network device to the terminal device includes an invalidity identifier of the first SSB information and the first SSB information, and further includes a validity identifier of the second SSB information and the second SSB information. After receiving the configuration information, the terminal device may determine that the second SSB information in the configuration information is valid.

In method 3, the terminal device determines that the first SSB information is valid when the received configuration information includes a validity identifier of the first SSB information and the first SSB information.

For example, the network device selects the first SSB information to be valid, and selects to include the validity identifier of the first SSB information and the first SSB information in the configuration information transmitted to the terminal device. After receiving the configuration information, the terminal device may determine that the first SSB information in the configuration information is valid.

In method 4, the terminal device determines that the second SSB information is valid when the received configuration information includes a validity identifier of the second SSB information and the second SSB information.

For example, the network device selects the second SSB information to be valid, and selects to include the validity identifier of the second SSB information and the second SSB information in the configuration information transmitted to the terminal device. After receiving the configuration information, the terminal device may determine that the second SSB information is valid.

Optionally, at S210 of the embodiments of the present disclosure, detecting, by the terminal device, the first SSB information includes: determining, by the terminal device in response to determining that the first SSB information in the configuration information is valid, that first SSB information corresponding to a detected SSB is consistent with the first SSB information in the configuration information.

For example, after determining that the first SSB information is valid, the terminal device may obtain, in response to receiving the SSB, the SSB candidate index in the first SSB information corresponding to the SSB. The SSB candidate index corresponding to the SSB is compared with the SSB candidate index included in the first SSB information in the configuration information to determine whether they are consistent with each other. When they are consistent with each other, the terminal device can detect the CSI-RS associated with the SSB candidate index.

Optionally, in an embodiment of the present disclosure, the signal detection method further includes: determining, by the terminal device in response to determining that the second SSB information in the configuration information is valid, that second SSB information corresponding to a detected SSB is consistent with the second SSB information in the configuration information.

For example, after determining that the second SSB information is valid, the terminal device may obtain, in response to receiving the SSB, the SSB index in the second SSB information corresponding to the SSB. The SSB index corresponding to the SSB is compared with the SSB index included in the second SSB information in the configuration information to determine whether they are consistent with each other. When they are consistent with each other, the terminal device can detect the CSI-RS associated with the SSB index.

In an application scenario, in a communication system of an unlicensed frequency band, such as an NR-U system, a method for detecting a valid CSI-RS resource may include: configuring, by the network device, the first SSB information. The first SSB information includes the SSB candidate index associated with the CSI-RS. When transmitting a corresponding SSB on the SSB candidate index, the network device transmits the CSI-RS associated with the first SSB information. The terminal device detects the first SSB information corresponding to the SSB, and detects the CSI-RS associated with the SSB candidate index included in the first SSB information. In this way, the SSB and the CSI-RS are bound for transmission, thus being capable of meeting the requirements for the channel occupancy rate and avoiding unnecessary transmission and detection of the CSI-RS. An implementation process of the signal detection method of the present disclosure will be described below by using several specific embodiments.

Embodiment 1

When the network device such as the base station configures the CSI-RS, the network device configures, for the CSI-RS, first SSB information associated with the CSI-RS. The first SSB information includes the SSB candidate index associated with the CSI-RS. When the base station transmits a corresponding SSB at the resource position of the SSB candidate index, the base station transmits the CSI-RS associated with the SSB candidate index.

The terminal device such as the UE obtains a configuration of the CSI-RS, and determines the first SSB information associated with the CSI-RS. The first SSB information includes the SSB candidate index associated with the CSI-RS. When the UE detects the SSB corresponding to the SSB candidate index, for example, when the SSB received by the UE includes the SSB candidate index, the UE detects the CSI-RS associated with the SSB candidate index.

Figure 6:
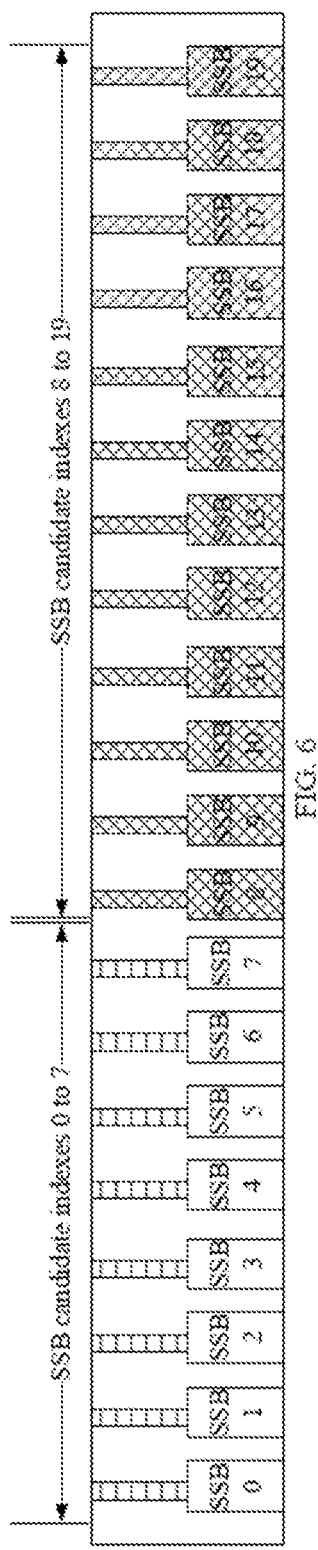
FIG. 6 is an exemplary diagram of associated transmissions of SSBs and CSI-RSs according to an embodiment of the present disclosure.

For example, a specific time window includes 20 determined SSB candidate positions, and the SSB candidate indexes are 0 to 19. An actual number of SSBs to be transmitted is 8, and the base station may already obtain a channel to transmit the SSB at an SSB candidate position 0. The base station may use resource positions having the SSB candidate indexes of 0 to 7 to transmit the SSBs, and no SSB needs to be transmitted at resource positions having SSB candidate indexes of 8 to 19. Correspondingly, the CSI-RSs associated with the SSB candidate indexes 0 to 7 are transmitted on the resource positions having the SSB candidate indexes of 0 to 7, and CSI-RSs associated with the SSB candidate indexes 8 to 19 are not transmitted on the resource positions having the SSB candidate indexes of 8 to 19, as illustrated in FIG. 6.

In an example, a configuration method for the CSI-RS may include: carrying, when configuring the CSI-RS, the first SSB information associated with the CSI-RS in configuration information. The first SSB information includes the SSB candidate index associated with the CSI-RS. When the SSB corresponding to the SSB candidate index is transmitted, the CSI-RS associated with the SSB is transmitted. After detecting the SSB corresponding to the SSB candidate index, the UE detects the CSI-RS associated with the SSB candidate index.

For example, an Information Element (IE) structure is as follows:

```
CSI-RS-configuration ::= SEQUENCE {
  ...
  AssociatedSSB              SEQUENCE {
  ...
  ssb_candidate_index        SSB-Candidate_Index,
  ...
  }
  ...
}
```

In the IE structure, AssociatedSSB represents the first SSB information associated with the CSI-RS, and ssb_candidate_index represents the first SSB information associated with the CSI-RS and indicated by the SSB candidate index. SEQUENCE of AssociatedSSB in the IE structure represents that a sequence included in the configuration information transmitted by the base station to the UE may include the SSB candidate index associated with the CSI-RS.

Embodiment 2

When the network device such as the base station configures the CSI-RS, the network device configures, for the CSI-RS, the first SSB information associated with the CSI-RS. The first SSB information includes the SSB candidate index associated with the CSI-RS. When transmitting the corresponding SSB at the resource position of the SSB candidate index, the base station transmits the CSI-RS associated with the SSB candidate index.

The terminal device such as the UE obtains the configuration of the CSI-RS, and determines the first SSB information associated with the CSI-RS. The first SSB information includes the SSB candidate index associated with the CSI-RS. When the UE detects the SSB corresponding to the SSB candidate index, for example, when the SSB received by the UE includes the SSB candidate index, the UE detects the CSI-RS associated with the SSB candidate index.

In addition, when configuring the CSI-RS, the base station configures, for the CSI-RS resource, the second information associated with the CSI-RS resource. The second SSB information includes the SSB index associated with the CSI-RS. When transmitting the corresponding SSB at the resource position of the SSB index, the base station transmits the CSI-RS associated with the SSB index.

The UE obtains the configuration of the CSI-RS, and determines the second SSB information associated with the CSI-RS. The second SSB information includes the SSB index associated with the CSI-RS. When the UE detects the SSB corresponding to the SSB index, for example, when the SSB received by the UE includes the SSB index, the UE detects the CSI-RS associated with the SSB index.

In this embodiment, a purpose of associating the CSI-RS with the first SSB information represented by the SSB candidate index is different from a purpose of associating the CSI-RS with the second SSB information represented by the SSB index. The two configurations, i.e., the first SSB information being associated with the CSI-RS and the second SSB information being associated with the CSI-RS, are alternative configurations, so as to avoid uncertainty in UE determination. For example, after the CSI-RS is associated with the SSB candidate index in the first SSB information, when the CSI-RS is also associated with the SSB index in the second SSB information, confusion may appear in a determination result of the UE. For example, the first SSB information is an SSB having an SSB candidate index of 9, the second SSB information includes an SSB having an SSB index of 1, and the QCL parameter Q is equal to 8. In this case, both the SSB having the SSB candidate index of 9 and the SSB having the SSB index of 1 correspond to the SSB index of 1. When the UE detects the SSB at the resource position having the SSB candidate index of 1, the UE actually also detects the SSB at the SSB index of 1, and thus the UE should detect the above CSI-RS. However, since the UE fails to detect the SSB at a position having the SSB candidate index of 9, the UE should not detect the above CSI-RS. Thus, a problem of confusion in the determination result of the UE may arise. A solution adopted may include: setting the configuration of the first SSB information and the configuration of the second SSB information to be mutually exclusive, and selecting, by the base station in an alternative manner or the like, the SSB information to be included in the configuration information.

In an example, the configuration method for the CSI-RS may include: carrying, when configuring the CSI-RS, the first SSB information associated with the CSI-RS in the configuration information. The first SSB information includes the SSB candidate index associated with the CSI-RS. The configuration information may further carry the validity identifier of the first SSB information for indicating that the first SSB information is valid.

The configuration method for the CSI-RS may include: carrying, when configuring the CSI-RS, the second SSB information associated with the CSI-RS in the configuration information. The second SSB information includes the SSB index associated with the CSI-RS. The configuration information may further carry the validity identifier of the second SSB information for indicating that the second SSB information is valid.

In the base station, the first SSB information and the second SSB information are in a selectable relationship, for example, an alternative relationship.

For example, an IE structure is as follows:

```
CSI-RS-configuration ::= SEQUENCE {
    ...
    AssociatedSSB           CHOICE {
    ...
    ssb_candidate_index     SSB-Candidate_Index,
    ssb-Index               ,
                            ...
    }
    ...
}
```

In the IE structure, AssociatedSSB represents the SSB information associated with the CSI-RS, including the first SSB information or the second SSB information, ssb_candidate_index represents the first SSB information associated with the CSI-RS and indicated by the SSB candidate index, and ssb-index represents the second SSB information associated with the CSI-RS and indicated by the SSB index. CHOICE in the IE structure represents that the base station selects to include the SSB candidate index associated with the CSI-RS in the configuration information, or selects to include the SSB index associated with the CSI-RS in the configuration information.

Embodiment 3

For the problem of UE confusion described in Embodiment 2, in alternative to selecting the first SSB information or the second SSB information by the base station during configuration, a pre-configured rule can also be used to solve the uncertainty in the UE determination.

By means of a pre-configured rule such as provisioned by a protocol, after receiving the configuration information, the UE determines whether the SSB information in the received configuration information is valid.

For example, the CSI-RS configuration is associated with the first SSB information and the second SSB information. Specifically, a certain CSI-RS is associated with the SSB candidate index in the first SSB information and the SSB index in the second SSB information. When the SSB candidate index in the first SSB information is valid, the UE ignores the SSB index in the second SSB information associated with the CSI-RS.

For another example, the CSI-RS configuration is associated with the first SSB information and the second SSB information. Specifically, a certain CSI-RS is associated with the SSB candidate index in the first SSB information and the SSB index in the second SSB information. When the SSB index in the second SSB information is valid, the UE ignores the SSB candidate index in the first SSB information associated with the CSI-RS.

In this embodiment, the first SSB information and the second SSB information, when configured by the base station, may not be mutually exclusive, and the UE may determine that the first SSB information is valid or the second SSB information is valid.

In an example, the configuration method of the CSI-RS may include: carrying, when configuring the CSI-RS, the first SSB information associated with the CSI-RS in the configuration information. The first SSB information includes the SSB candidate index associated with the CSI-RS. In addition, the configuration information carries the second SSB information associated with the CSI-RS. The second SSB information includes the SSB index associated with the CSI-RS. After receiving the configuration information, the UE may determine, based on a preconfigured rule, that the first SSB information is valid or the second SSB information is valid.

For example, when the preconfigured rule is that the first SSB information is valid, and the configuration information received by the UE carries the first SSB information and the second SSB information, the UE determines that the first SSB information is valid. Subsequently, the UE, in a case of detecting an SSB having the SSB candidate index included in the first SSB information, may further detect the CSI-RS associated with the SSB candidate index.

For another example, when the preconfigured rule is that the second SSB information is valid, and the configuration information received by the UE carries the first SSB information and the second SSB information, the UE determines that the second SSB information is valid. Subsequently, the UE, in a case of detecting an SSB having the SSB index included in the second SSB information, may further detect the CSI-RS associated with the SSB index.

For example, an IE structure is as follows:

```
CSI-RS-configuration ::= SEQUENCE {
    ...
    AssociatedSSB           SEQUENCE{
    ...
    ssb_candidate_index     SSB-Candidate_Index,
    ssb-Index               ,
    ...
    }
    ...
}
```

In the IE structure, AssociatedSSB represents the SSB information associated with the CSI-RS, including the first SSB information and/or the second SSB information, ssb_candidate_index represents the first SSB information associated with the CSI-RS and indicated by the SSB candidate index, and ssb-index represents the second SSB information associated with the CSI-RS and indicated by the SSB index. SEQUENCE of AssociatedSSB in the IE structure represents that a sequence included in the configuration information transmitted by the base station to the UE may include the SSB candidate index associated with the CSI-RS and the SSB index associated with the CSI-RS.

The signal detection method according to the embodiments of the present disclosure can be applied to a communication system of an unlicensed frequency band, e.g., an NR-U system, or a communication system of a licensed frequency band. It may also be applied to a D2D communication system or the like. For example, with the method according to the embodiments of the present disclosure, the first SSB information associated with the CSI-RS is configured in the NR-U system. The first SSB information includes the SSB candidate index associated with the CSI-RS. When transmitting an SSB at the resource position of the SSB candidate index, the network device transmits the CSI-RS associated with the first SSB information. The UE also detects, in response to detecting an SSB having the SSB candidate index, the CSI-RS associated with the SSB candidate index. In this way, the SSB and the CSI-RS are bound for transmission, thus being capable of meeting the requirements for the channel occupancy rate, as well as avoiding unnecessary transmission and detection of the CSI-RS, which is beneficial to alleviating the system resource overhead burden and reducing the detection overhead of the terminal device.

Figure 7:
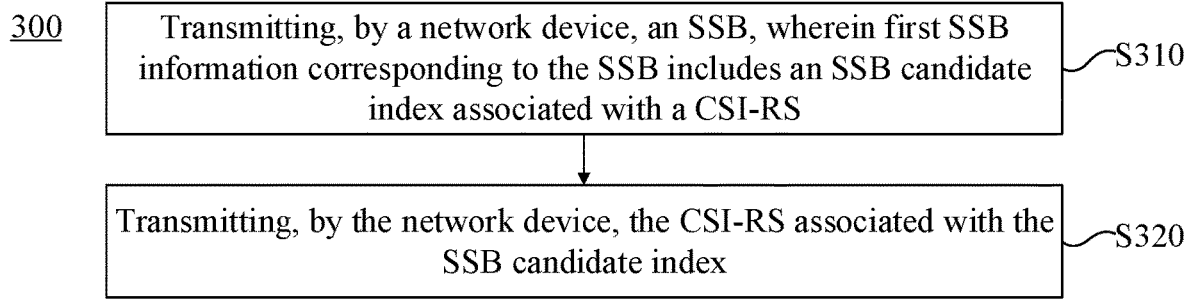
FIG. 7 is a schematic flowchart illustrating a signal transmission method according to another embodiment of the present disclosure.

FIG. 7 is a schematic flowchart illustrating a signal transmission method 300 according to another embodiment of the present disclosure. The method can optionally be applied to the system illustrated in FIG. 1, but is not limited in this regard. The method includes at least part of the following description.

At S310, a network device transmits an SSB. First SSB information corresponding to the SSB includes an SSB candidate index associated with a CSI-RS.

At S320, the network device transmits the CSI-RS associated with the SSB candidate index.

In the embodiments of the present disclosure, the network device may configure the CSI-RS associated with the SSB candidate index. When the network device transmits the SSB at the resource position of the SSB candidate index, the network device can correspondingly transmit the CSI-RS associated with the SSB candidate index. In addition, the first SSB information corresponding to the transmitted SSB may include the SSB candidate index associated with the CSI-RS.

After receiving the SSB transmitted by the network device, the terminal device can obtain the first SSB information corresponding to the SSB. The first SSB information includes the SSB candidate index corresponding to the resource position where the network device transmits the SSB. When the SSB candidate index corresponding to the resource position for transmitting the SSB is the SSB candidate index associated with the CSI-RS, the terminal device can detect the CSI-RS associated with the SSB candidate index.

Correspondingly, when the terminal device fails to detect the SSB corresponding to the SSB candidate index associated with the CSI-RS, the terminal device does not detect the CSI-RS. Or, when the terminal device fails to detect the SSB candidate index corresponding to the resource position for transmitting a certain SSB, the terminal device does not detect the CSI-RS.

Optionally, in an embodiment of the present disclosure, the signal transmission method further includes transmits, by the network device, configuration information. The configuration information includes the first SSB information.

Optionally, in an embodiment of the present disclosure, the network device may transmit configuration information to the terminal device through RRC signaling. In addition, the configuration information may also be transmitted in other ways such as broadcasting (for example, Mobile Internet Protocol (MIP), Session Initiation Protocol (SIP), etc.), MAC CE, DCI, etc. The present disclosure is not limited to any of these examples. After receiving the SSB transmitted by the network device, the terminal device may obtain the SSB candidate index in the first SSB information corresponding to the SSB. Then, the SSB candidate index corresponding to the SSB is compared with the SSB candidate index included in the first SSB information in the configuration information to determine whether they are consistent with each other. When they are consistent with each other, the terminal device can detect the CSI-RS associated with the SSB candidate index.

Optionally, in an embodiment of the present disclosure, the configuration information further includes second SSB information. The second SSB information includes an SSB index associated with the CSI-RS.

The network device may configure, for the CSI-RS, the SSB index associated with the CSI-RS, such that the terminal device needs to detect the SSB having the SSB index before detecting the CSI-RS. The network device may transmit the configuration information including the second SSB information to the terminal device by means of RRC signaling, broadcasting, MAC CE, DCI, etc. The second SSB information includes the SSB index associated with the CSI-RS.

Optionally, in an embodiment of the present disclosure, the SSB candidate index represents an index of a candidate position for transmitting an SSB, and the SSB index represents the QCL relationship between SSBs. The conversion relationship between the SSB candidate indexes and the SSB indexes can be obtained through the parameter Q of the QCL relationship. For example, the SSB index is obtained by performing the remainder operation through dividing the SSB candidate index by the parameter Q. For another example, the SSB index is obtained by performing the remainder operation through dividing the lower three bits of the SSB candidate index by the parameter Q. For an exemplary scenario of differences between the SSB candidate index and the SSB index, reference may be made to relevant description in the above embodiments of the method 200.

Optionally, in an embodiment of the present disclosure, the configuration information further includes a validity identifier of the first SSB information or a validity identifier of the second SSB information.

Optionally, in an embodiment of the present disclosure, the signal transmission method further includes: selecting, by the network device, to include the first SSB information or second SSB information in configuration information. The first SSB information includes the SSB candidate index associated with the CSI-RS, and the second SSB information includes an SSB index associated with the CSI-RS.

For example, the network device selects the first SSB information to be valid, and selects to include the validity identifier of the first SSB information and the first SSB information in the configuration information transmitted to the terminal device. After receiving the configuration information, the terminal device may determine that the first SSB information in the configuration information is valid. After determining that the first SSB information is valid, the terminal device may obtain, in response to receiving the SSB, the SSB candidate index in the first SSB information corresponding to the SSB. The SSB candidate index corresponding to the SSB is compared with the SSB candidate index included in the first SSB information in the configuration information to determine whether they are consistent with each other. When they are consistent with each other, the terminal device can detect the CSI-RS associated with the SSB candidate index.

For another example, the network device selects the second SSB information to be valid, and selects to include the validity identifier of the second SSB information and the second SSB information in the configuration information transmitted to the terminal device. After receiving the configuration information, the terminal device may determine that the second SSB information is valid. After determining that the second SSB information is valid, the terminal device may obtain, in response to receiving the SSB, the SSB index in the second SSB information corresponding to the SSB. The SSB index corresponding to the SSB is compared with the SSB index included in the second SSB information in the configuration information to determine whether they are consistent with each other. When they are consistent with each other, the terminal device can detect the CSI-RS associated with the SSB index.

For specific examples of the method 300 performed by the network device in this embodiment, reference may be made to relevant description of the network device such as the base station in Embodiment 1 to Embodiment 3 of the above method 200. For brevity, repeated description is omitted herein.

With the signal transmission method in this embodiment, the SSB and the CSI-RS are bound for transmission, thus being capable of meeting the requirements for the channel occupancy rate, as well as avoiding unnecessary transmission and detection of the CSI-RS, which is beneficial to alleviating of the system resource overhead burden and reducing the detection overhead of the terminal device.

Figure 8:
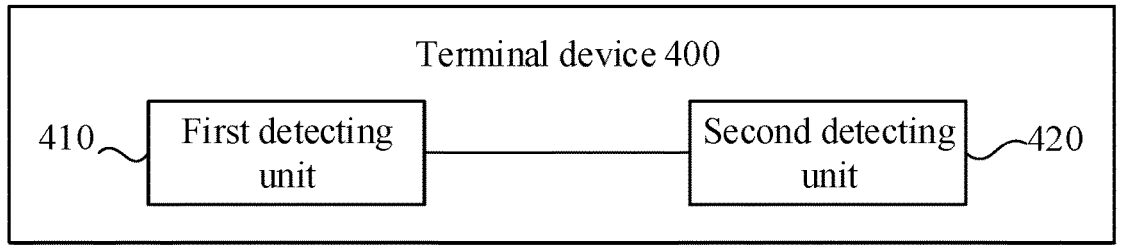
FIG. 8 is a schematic block diagram of a terminal device according to an embodiment of the present disclosure.

FIG. 8 is a schematic block diagram of a terminal device according to an embodiment of the present disclosure. The terminal device may include a first detecting unit 410 and a second detecting unit 420.

The first detecting unit 410 is configured to detect first SSB information. The first SSB information includes an SSB candidate index associated with a CSI-RS.

The second detecting unit 420 is configured to detect the CSI-RS associated with the SSB candidate index.

Figure 9:
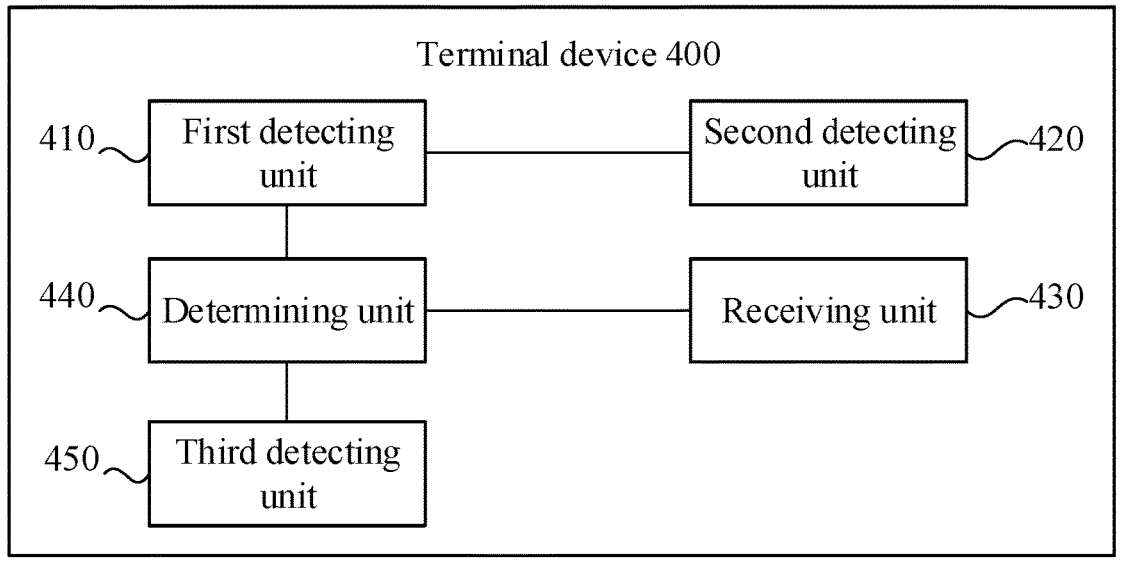
FIG. 9 is a schematic block diagram of a terminal device according to another embodiment of the present disclosure.

Optionally, in an embodiment of the present disclosure, as illustrated in FIG. 9, the terminal device 400 further includes a receiving unit 430. The receiving unit 430 is configured to receive configuration information. The configuration information includes the first SSB information.

Optionally, in an embodiment of the present disclosure, the configuration information further includes second SSB information, and the second SSB information includes an SSB index associated with the CSI-RS.

Optionally, in an embodiment of the present disclosure, the terminal device further includes a determining unit 440. The determining unit 440 is configured to determine that the first SSB information or the second SSB information in the configuration information is valid.

Optionally, in an embodiment of the present disclosure, the first detecting unit 410 is further configured to determine, in response to determining by the determining unit 440 that the first SSB information in the configuration information is valid, that first SSB information corresponding to a detected SSB is consistent with the first SSB information in the configuration information.

Optionally, in an embodiment of the present disclosure, the terminal device further includes a third detecting unit 450. The third detecting unit 450 is configured to determine, in response to determining by the determining unit 440 that the second SSB information is valid, that second SSB information corresponding to a detected SSB is consistent with the second SSB information in the configuration information.

Optionally, in an embodiment of the present disclosure, the determining unit 440 is configured to determine that the first SSB information or the second SSB information in the configuration information is valid by at least one of: determining, when the received configuration information includes the first SSB information and the second SSB information, that the first SSB information is valid; determining, when the received configuration information includes the first SSB information and the second SSB information, that the second SSB information is valid; determining, when the received configuration information includes a validity identifier of the first SSB information and the first SSB information, that the first SSB information is valid; or determining, when the received configuration information includes a validity identifier of the second SSB information and the second SSB information, that the second SSB information is valid.

It should be understood that the above and other operations and/or functions of units in the terminal device according to the embodiments of the present disclosure are respectively intended to implement corresponding processes of the terminal device in the method 200 in FIG. 2. For brevity, repeated description is omitted herein.

Figure 10:
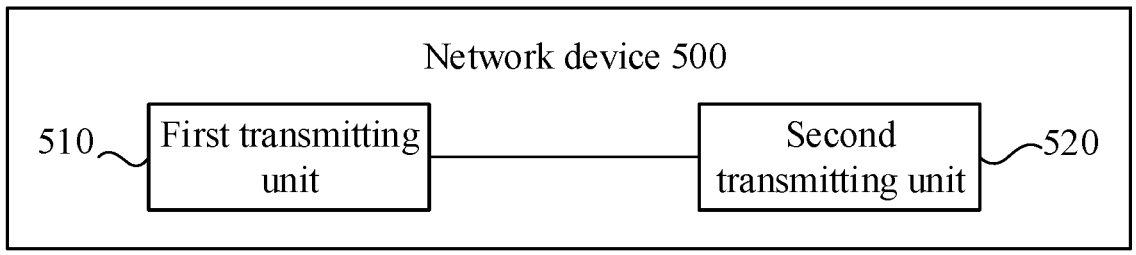
FIG. 10 is a schematic block diagram of a network device according to an embodiment of the present disclosure.

FIG. 10 is a schematic block diagram of a network device 500 according to an embodiment of the present disclosure. The network device can include a first transmitting unit 510 and a second transmitting unit 520.

The first transmitting unit 510 is configured to transmit an SSB. First SSB information corresponding to the SSB includes an SSB candidate index associated with a CSI-RS.

The second transmitting unit 520 is configured to transmit the CSI-RS associated with the SSB candidate index.

Figure 11:
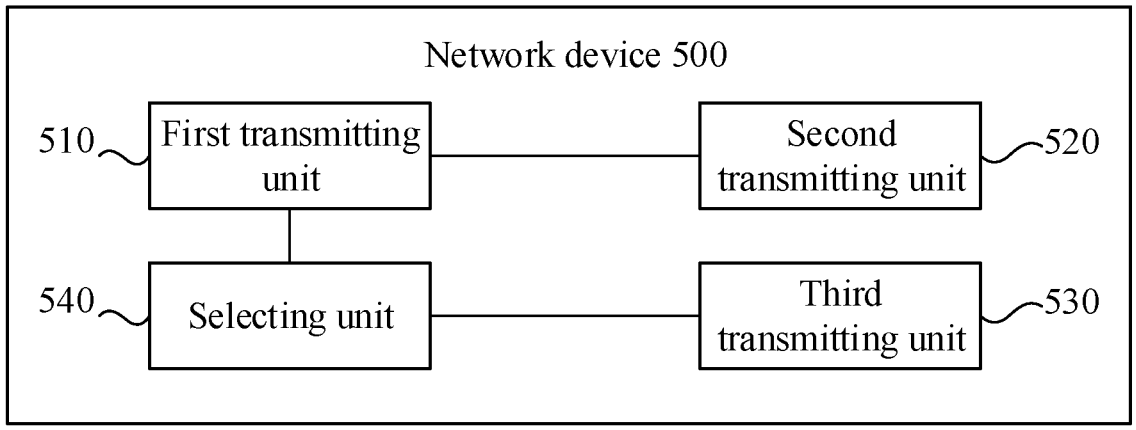
FIG. 11 is a schematic block diagram of a network device according to another embodiment of the present disclosure.

Optionally, in an embodiment of the present disclosure, as illustrated in FIG. 11, the network device further includes a third transmitting unit 530. The third transmitting unit 530 is configured to transmit configuration information. The configuration information includes the first SSB information.

Optionally, in an embodiment of the present disclosure, the configuration information further includes second SSB information, and the second SSB information includes an SSB index associated with the CSI-RS.

Optionally, in an embodiment of the present disclosure, the configuration information further includes a validity identifier of the first SSB information or a validity identifier of the second SSB information.

Optionally, in an embodiment of the present disclosure, the network device further includes a selecting unit 540. The selecting unit 540 is configured to select to include the first SSB information or second SSB information in configuration information. The first SSB information includes the SSB candidate index associated with the CSI-RS, and the second SSB information includes an SSB index associated with the CSI-RS.

It should be understood that the above and other operations and/or functions of units in the network device according to the embodiments of the present disclosure are respectively intended to implement corresponding processes of the network device in the method 300 in FIG. 7. For brevity, repeated description is omitted herein.

Figure 12:
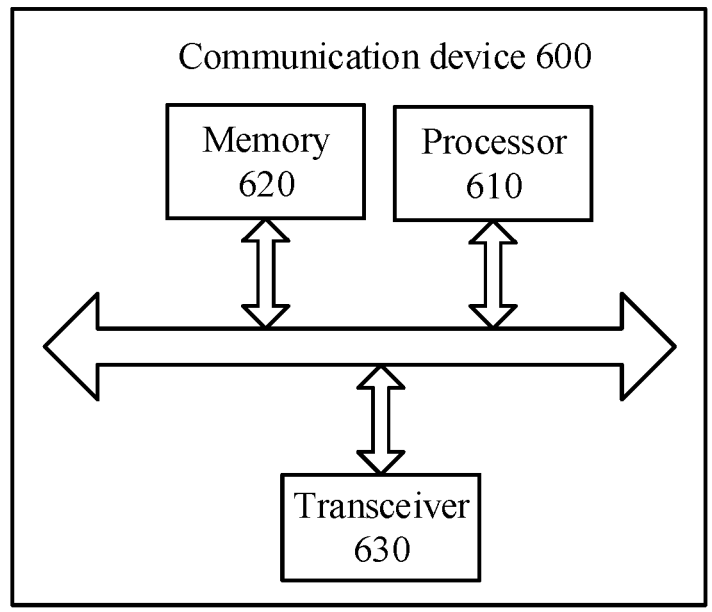
FIG. 12 is a schematic block diagram of a communication device according to an embodiment of the present disclosure.

FIG. 12 is a schematic block diagram of a communication device 600 according to an embodiment of the present disclosure. The communication device 600 illustrated in FIG. 12 includes a processor 610. The processor 610 is configured to invoke and execute a computer program from a memory to perform the method according to an embodiment of the present disclosure.

Optionally, as illustrated in FIG. 12, the communication device 600 may further include a memory 620. Here, the processor 610 may invoke and execute a computer program from the memory 620 to perform the method according to an embodiment of the present disclosure.

Here, the memory 620 may be a separate component independent of the processor 610, or may be integrated in the processor 610.

Optionally, as illustrated in FIG. 12, the communication device 600 may further include a transceiver 630. The processor 610 may control the transceiver 630 to communicate with other devices. Specifically, information or data may be transmitted to other devices, or information or data transmitted by other devices may be received.

Here, the transceiver 630 may include a transmitter and a receiver. The transceiver 630 may further include one or more antennas.

Optionally, the communication device 600 may be a network device according to an embodiment of the present disclosure. The communication device 600 may execute corresponding processes implemented by the network device in methods according to embodiments of the present disclosure. For brevity, repeated description is omitted herein.

Optionally, the communication device 600 may be a terminal device according to an embodiment of the present disclosure. The communication device 600 may execute corresponding processes implemented by the terminal device in methods according to embodiments of the present disclosure. For brevity, repeated description is omitted herein.

Figure 13:
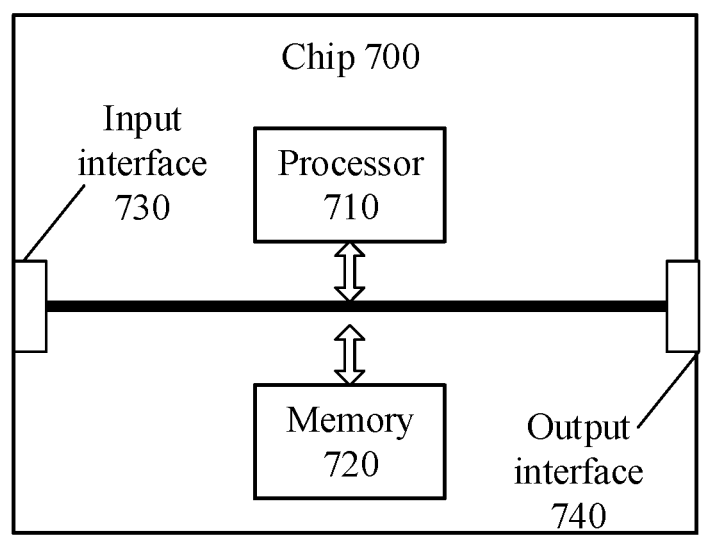
FIG. 13 is a schematic block diagram of a chip according to an embodiment of the present disclosure.

FIG. 13 is a schematic block diagram of a chip 700 according to an embodiment of the present disclosure. The chip 700 illustrated in FIG. 13 includes a processor 710. The processor 710 can invoke and run a computer program from the memory to perform the method according to an embodiment of the present disclosure.

Optionally, as illustrated in FIG. 13, the chip 700 may further include a memory 720. The processor 710 may invoke and run a computer program from the memory 720 to perform the method according to an embodiment of the present disclosure.

Here, the memory 720 may be a separate component independent of the processor 710, or may be integrated in the processor 710.

Optionally, the chip 700 may further include an input interface 730. Here, the processor 710 can control the input interface 730 to communicate with other devices or chips. Specifically, information or data transmitted by other devices or chips can be obtained.

Optionally, the chip 700 may further include an output interface 740. Here, the processor 710 can control the output interface 740 to communicate with other devices or chips. Specifically, information or data may be transmitted to other devices or chips.

Optionally, the chip can be applied to the network device according to an embodiment of the present disclosure. In addition, the chip can execute corresponding processes implemented by the network device in methods according to embodiments of the present disclosure. For brevity, repeated description is omitted herein.

Optionally, the chip can be applied to the terminal device according to an embodiment of the present disclosure. In addition, the chip can execute corresponding processes implemented by the terminal device in methods according to embodiments of the present disclosure. For brevity, repeated description is omitted herein.

It should be understood that the chip mentioned in the embodiments of the present disclosure may also be referred to as a system-level chip, a system-chip, a chip system, or a system-on-chip.

The processor mentioned above may be a general-purpose processor, a Digital Signal Processor (DSP), a Field Programmable Gate Array (FPGA), an Application Specific Integrated Circuit (ASIC) or another programmable logic device, a transistor logic device, a discrete hardware component, etc. Here, the general-purpose processor mentioned above may be a microprocessor or any conventional processor.

The memory mentioned above may be a volatile memory or a non-volatile memory, or may include both volatile and non-volatile memories. Here, the non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM).

It should be understood that the above memories are exemplary only, rather than limiting the present disclosure. For example, the memory in the embodiment of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), a Direct Rambus RAM (DR RAM) or the like. That is, the memory in the embodiments of the present disclosure is intended to include, but is not limited to, these and any other suitable types of memories.

Figure 14:
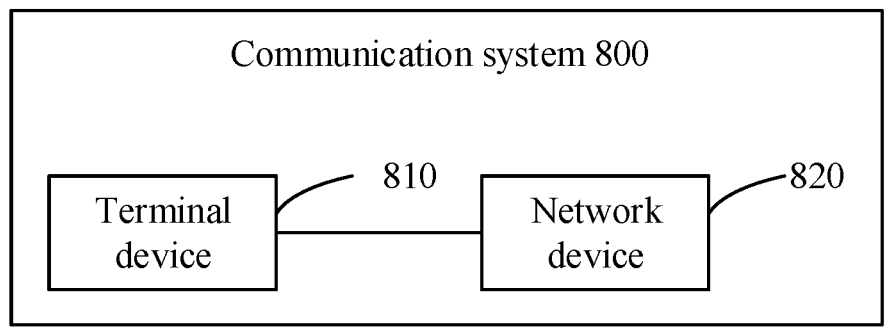
FIG. 14 is a schematic block diagram of a communication system according to an embodiment of the present disclosure.

FIG. 14 is a schematic block diagram of a communication system 800 according to an embodiment of the present disclosure. As illustrated in FIG. 14, the communication system 800 includes a terminal device 810 and a network device 820.

The network device is configured to transmit an SSB. First SSB information corresponding to the SSB includes an SSB candidate index associated with a CSI-RS. The network device is further configured to transmit the CSI-RS associated with the SSB candidate index.

The terminal device is configured to detect first SSB information. The first SSB information includes an SSB candidate index associated with a CSI-RS. The terminal device is further configured to detect the CSI-RS associated with the SSB candidate index.

Here, the terminal device 810 can be configured to implement the corresponding functions implemented by the terminal device in the above method 200, and the composition of the terminal device 810 may be as illustrated for the terminal device 400 in the above embodiments. The network device 820 can be configured to implement corresponding functions implemented by the network device in the above method 300, and the composition of the network device 820 may be as illustrated for the network device 500 in the above embodiments. For brevity, repeated description is omitted herein.

The above embodiments may be implemented in whole or in part by software, hardware, firmware, or any combination thereof. When implemented by software, the embodiments may be implemented in whole or in part in the form of a computer program product. The computer program product includes one or more computer instructions. When the computer program instructions are loaded and executed on a computer, all or part of the processes or functions according to the embodiments of the present disclosure are generated. The computer may be a general-purpose computer, a dedicated computer, a computer network, or another programmable apparatus. The computer instructions may be stored in a computer-readable storage medium, or transmitted from one computer-readable storage medium to another. For example, the computer instructions may be transmitted from one web site, computer, server, or data center to another via a wired (e.g., coaxial cable, optical fiber, Digital Subscriber Line (DSL)) or wireless (e.g., infrared, wireless, microwave, etc.) connection. The computer-readable storage medium can be any available medium that can be accessed by a computer, or can be a data storage device such as a server or a data center integrated with one or more available media. The available media may be magnetic media (e.g., floppy disks, hard disks, magnetic tapes), optical media (e.g., Digital Video Discs (DVD)), or semiconductor media (e.g., Solid State Disks (SSDs)), etc.

It should be understood that, in various embodiments of the present disclosure, numerical values of the sequence numbers of the above processes do not imply an execution sequence. The execution sequence of the processes shall be determined by their functions and internal logic, and shall not constitute any limitation to implementation processes of the embodiments of the present disclosure.

Those skilled in the art can clearly understand that, for the sake of convenience and conciseness of description, regarding the specific operation processes of the systems, apparatuses, and units described above, reference can be made to the corresponding processes in the above method embodiments, and repeated description is omitted herein.

While only specific embodiments of the present disclosure have been described above, the protection scope of the present disclosure is not limited to these embodiments. Various variants and alternatives can be easily conceived by any of those skilled in the art without departing from the technical scope of the present disclosure. Therefore, these variants and alternatives are to be encompassed by the protection scope of present disclosure as defined by the claims as attached.

What is claimed is:

1. A signal transmission method, applied to a New Radio-based access to unlicensed spectrum (NR-U) system and comprising:
    transmitting, by a network device, a Synchronization Signal/Physical Broadcast Channel Block (SSB), wherein first SSB information corresponding to the SSB comprises an SSB candidate index associated with a Channel State Information-Reference Signal (CSI-RS), wherein the SSB candidate index represents an index of an SSB candidate position for actually transmitting the SSB in a plurality of SSB candidate positions, the plurality of SSB candidate positions corresponding to a same SSB index, and the SSB candidate index is determined by the network device based on LBT being performed successfully on the SSB candidate position for actually transmitting the SSB;
    transmitting, by the network device, configuration information by broadcasting at least one of a medium access control element (MAC CE) or downlink control information (DCI), wherein the configuration information comprises the first SSB information; and
    transmitting, by the network device, the CSI-RS associated with the SSB candidate index.

2. The method according to claim 1, wherein the configuration information further comprises second SSB information, and the second SSB information comprises an SSB index associated with the CSI-RS.

3. The method according to claim 2, wherein the configuration information further comprises a validity identifier of the first SSB information or a validity identifier of the second SSB information.

4. The method according to claim 1, further comprising:
    selecting, by the network device, to comprise the first SSB information or second SSB information in configuration information, wherein the first SSB information comprises the SSB candidate index associated with the CSI-RS, and the second SSB information comprises an SSB index associated with the CSI-RS.

5. A network device, applied to a New Radio-based access to unlicensed spectrum (NR-U) system and comprising:
    a memory having a computer program stored thereon; and
    a processor configured to invoke and execute the computer program stored in the memory to perform:
        transmitting a Synchronization Signal/Physical Broadcast Channel Block (SSB), wherein first SSB information corresponding to the SSB comprises an SSB candidate index associated with a Channel State Information-Reference Signal (CSI-RS), wherein the SSB candidate index represents an index of an SSB candidate position for actually transmitting the SSB in a plurality of SSB candidate positions, the plurality of SSB candidate positions corresponding to a same SSB index, and the SSB candidate index is determined by the network device based on LBT being performed successfully on the SSB candidate position for actually transmitting the SSB;
        transmitting configuration information by broadcasting at least one of a medium access control element (MAC CE) or downlink control information (DCI), wherein the configuration information comprises the first SSB information; and
        transmitting the CSI-RS associated with the SSB candidate index.

6. The network device according to claim 5, wherein the configuration information further comprises second SSB information, and the second SSB information comprises an SSB index associated with the CSI-RS.

7. The network device according to claim 6, wherein the configuration information further comprises a validity identifier of the first SSB information or a validity identifier of the second SSB information.

8. The network device according to claim 5, wherein the processor is further configured to invoke and execute the computer program stored in the memory to perform:
    selecting to comprise the first SSB information or second SSB information in configuration information, wherein the first SSB information comprises the SSB candidate index associated with the CSI-RS, and the second SSB information comprises an SSB index associated with the CSI-RS.

9. A signal detection method, applied to a New Radio-based access to unlicensed spectrum (NR-U) system and comprising:
    detecting, by a terminal device, first Synchronization Signal/Physical Broadcast Channel Block (SSB) information, wherein the first SSB information comprises an SSB candidate index associated with a Channel State Information-Reference Signal (CSI-RS), wherein the SSB candidate index represents an index of an SSB candidate position for actually transmitting the SSB in a plurality of SSB candidate positions, the plurality of SSB candidate positions corresponding to a same SSB index, and the SSB candidate index is determined by a network device based on LBT being performed successfully on the SSB candidate position for actually transmitting the SSB;
    receiving, by the terminal device, configuration information, wherein the configuration information is transmitted by a network device by broadcasting at least one of a medium access control element (MAC CE) or downlink control information (DCI), and the configuration information comprises the first SSB information; and
    detecting, by the terminal device, the CSI-RS associated with the SSB candidate index.

10. A terminal device, applied to a New Radio-based access to unlicensed spectrum (NR-U) system and comprising:
    a memory having a computer program stored thereon; and
    a processor configured to invoke and execute the computer program stored in the memory to perform the method according to claim 9.

11. The terminal device according to claim 10, wherein the configuration information further comprises second SSB information, and the second SSB information comprises an SSB index associated with the CSI-RS.

12. The terminal device according to claim 11, wherein the processor is further configured to invoke and execute the computer program stored in the memory to perform:
determining that the first SSB information or the second SSB information in the configuration information is valid.

13. The terminal device according to claim 12, wherein the processor is configured to invoke and execute the computer program stored in the memory to perform:
determining, in response to determining that the first SSB information in the configuration information is valid, that first SSB information corresponding to a detected SSB is consistent with the first SSB information in the configuration information.

14. The terminal device according to claim 12, wherein the processor is further configured to invoke and execute the computer program stored in the memory to perform:
determining, in response to determining that the second SSB information in the configuration information is valid, that second SSB information corresponding to a detected SSB is consistent with the second SSB information in the configuration information.

15. The terminal device according to claim 12, wherein the processor is configured to invoke and execute the computer program stored in the memory to perform at least one of:
determining that the first SSB information is valid, when the received configuration information comprises the first SSB information and the second SSB information;
determining that the second SSB information is valid, when the received configuration information comprises the first SSB information and the second SSB information;
determining that the first SSB information is valid, when the received configuration information comprises a validity identifier of the first SSB information and the first SSB information; or
determining that the second SSB information is valid, when the received configuration information comprises a validity identifier of the second SSB information and the second SSB information.

16. A non-transitory computer-readable storage medium, having a computer program stored thereon, wherein the computer program causes a computer to perform the method according to claim 1.

17. A non-transitory computer-readable storage medium, having a computer program stored thereon, wherein the computer program causes a computer to perform the method according to claim 9.

* * * * *